(12) United States Patent
Duerdodt et al.

(10) Patent No.: US 7,697,897 B2
(45) Date of Patent: Apr. 13, 2010

(54) METHOD AND APPARATUS FOR ADAPTIVE ACTIVATION OR DEACTIVATION OF THE COORDINATION OF THE RADIO ACTIVITIES OF TWO MOBILE-RADIO TRANSMITTING AND/OR RECEIVING DEVICES

(75) Inventors: Christian Duerdodt, Bochum (DE); Roland Hellfajer, Bochum (DE); Britta Olschner, München (DE)

(73) Assignee: Infineon Technologies AG, Neubiberg (DE)

( * ) Notice: Subject to any disclaimer, the term of this patent is extended or adjusted under 35 U.S.C. 154(b) by 824 days.

(21) Appl. No.: 11/532,666

(22) Filed: Sep. 18, 2006

(65) Prior Publication Data

US 2007/0066227 A1 Mar. 22, 2007

Related U.S. Application Data

(63) Continuation of application No. PCT/DE2005/000464, filed on Mar. 14, 2005.

(30) Foreign Application Priority Data

Mar. 18, 2004 (DE) ........................ 10 2004 013 494

(51) Int. Cl.
*H04B 1/00* (2006.01)
(52) U.S. Cl. ............... 455/63.1; 455/63.2; 455/41.2; 455/67.13; 455/114.2; 375/254; 375/278
(58) Field of Classification Search ............ 455/63.1, 455/63.2, 41.2, 67.13, 114.2, 135, 501, 222; 375/132, 202, 254, 278
See application file for complete search history.

(56) References Cited

U.S. PATENT DOCUMENTS 5,838,741 A * 11/1998 Callaway et al. ............ 375/346

| | | | |
|---|---|---|---|
| 6,647,273 B2 * | 11/2003 | Parssinen et al. | 455/522 |
| 6,711,134 B1 * | 3/2004 | Wichelman et al. | 370/241 |
| 6,842,607 B2 * | 1/2005 | Godfrey et al. | 455/41.2 |
| 6,954,616 B2 * | 10/2005 | Liang et al. | 455/63.1 |

(Continued)

FOREIGN PATENT DOCUMENTS

| | | |
|---|---|---|
| EP | 1119137 | 1/2000 |
| EP | 1389855 | 8/2003 |
| WO | 01/84789 | 11/2001 |
| WO | 03/105418 | 12/2003 |

OTHER PUBLICATIONS

"Coexistence Mechanisms for Interference Mitigation between IEEE 802.11 WLANs and Bluetooth" by C.F. Chiasserini et al., Proceedings IEEE Infocom 2002. The Conference on Computer Communications. 21$^{st}$. Annual Joint Conference of the IEEE Computer and Communications Societies. New York, NY, Jun. 23-27, 2002, Proceedings IEEE Infocom. The Conference on Computer Communica, vol. 1, of 3. Conf. 21, Jun. 23, 2002. (pp. 590-598).

(Continued)

*Primary Examiner*—Minh D Dao
(74) *Attorney, Agent, or Firm*—Dicke, Billig & Czaja, PLLC

(57) ABSTRACT

The method is based on the capability for coordination of the radio activities of two mobile radio transmitting and/or receiving devices (3, 4). In the case of the method, a value of at least one characteristic variable ($P_{RSSI,BT}$, N; 15, 16, 17) is first of all determined, which is characteristic of the requirement for coordination of the radio activity of one or both transmitting and/or receiving devices. The coordination of the radio activity of one or both transmitting and/or receiving devices is then activated or deactivated as a function of the value.

12 Claims, 3 Drawing Sheets

U.S. PATENT DOCUMENTS

| | | | |
|---|---|---|---|
| 7,039,358 B1* | 5/2006 | Shellhammer et al. | 455/41.2 |
| 7,099,671 B2* | 8/2006 | Liang | 455/450 |
| 7,415,279 B2* | 8/2008 | Liang | 455/450 |
| 7,443,785 B2* | 10/2008 | Bloebaum | 370/216 |
| 7,463,644 B2* | 12/2008 | Zhu et al. | 370/445 |
| 7,493,133 B2* | 2/2009 | Krishnan et al. | 455/522 |
| 7,525,942 B2* | 4/2009 | Cordone | 370/335 |
| 7,545,505 B2* | 6/2009 | Lehmann et al. | 356/497 |
| 2003/0083095 A1* | 5/2003 | Liang | 455/552 |
| 2005/0128995 A1* | 6/2005 | Ott et al. | 370/349 |
| 2005/0129051 A1* | 6/2005 | Zhu et al. | 370/445 |
| 2005/0176455 A1* | 8/2005 | Krishnan et al. | 455/522 |
| 2005/0207350 A1* | 9/2005 | Bloebaum | 370/252 |
| 2006/0291476 A1* | 12/2006 | Meir | 370/395.43 |
| 2007/0047494 A1* | 3/2007 | Cordone | 370/335 |
| 2008/0013473 A1* | 1/2008 | Proctor et al. | 370/315 |
| 2009/0052574 A1* | 2/2009 | Li et al. | 375/296 |
| 2009/0088199 A1* | 4/2009 | Nurminen et al. | 455/552.1 |
| 2009/0122911 A1* | 5/2009 | Carey | 375/296 |

OTHER PUBLICATIONS

IEEE Computer Society: "Part 15.2—Coexistence of Wireless Personal Area Networks With Other Wireless Devices Operating in Unlicensed Bands" IEEE Std 802.15.2-2003-IEEE Recommended Practice for Information Technology—Telecommunications and Information Exchange Between Systems—Local and Metropolitan Networks—Specific Requirements, 'Online! Aug. 28, 2003. (pp. i-viii, 1-22).

"Coverage of 802.11g WLANs in the Presence of Bluetooth Interference" by K.K. wong et al., Personal, Indoor and Mobile Radio Communications, 2003. PIMRC 2003. 14th IEEE Proceedings in Sep. 7-10, 2003, Piscataway, NJ, USA, IEEE, vol. 2, Sep. 7, 2003. (pp. 2027-2031).

\* cited by examiner

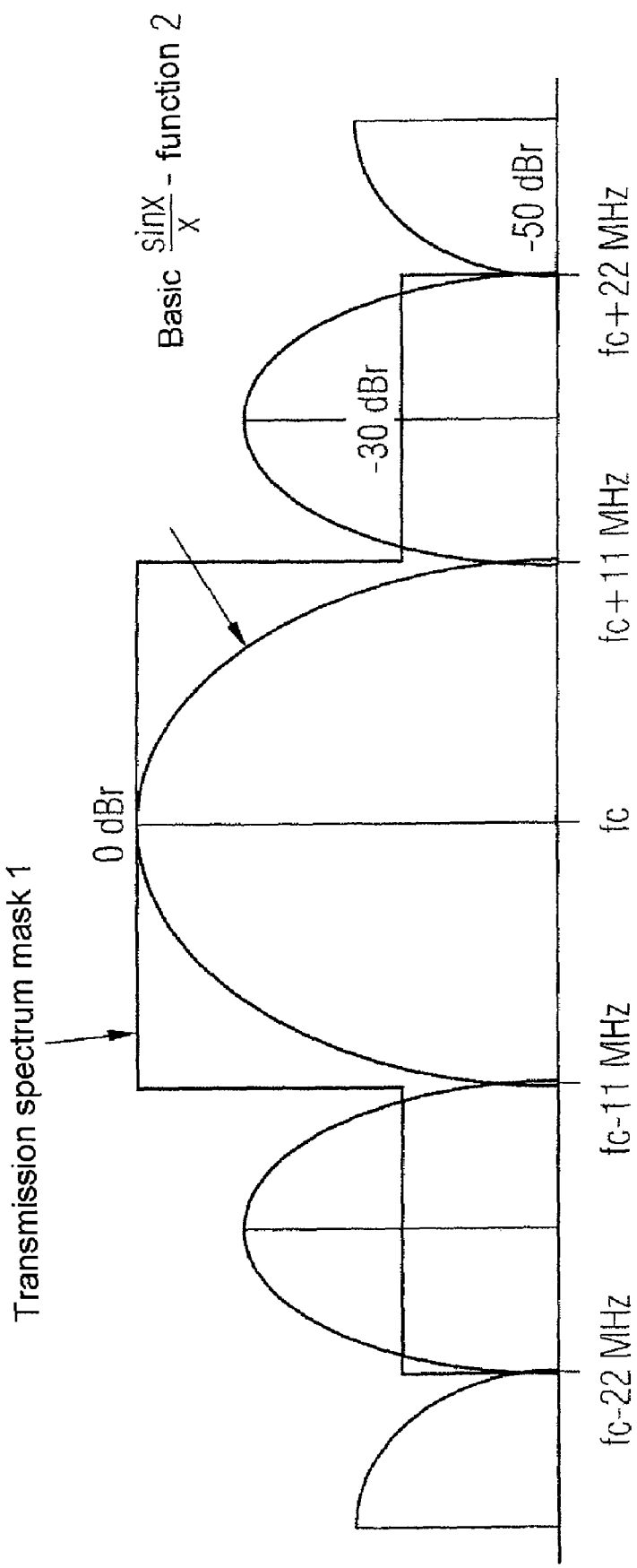

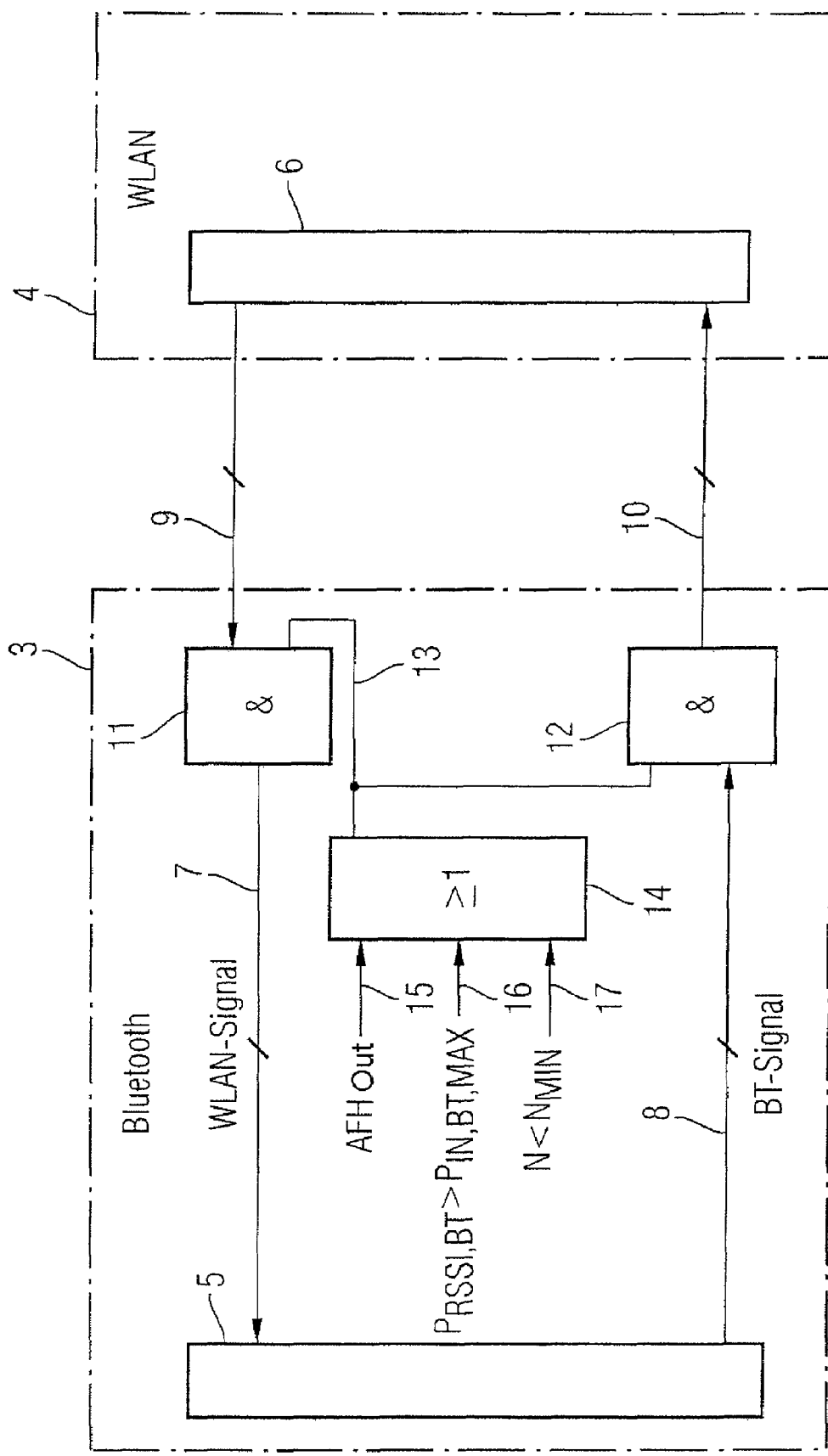

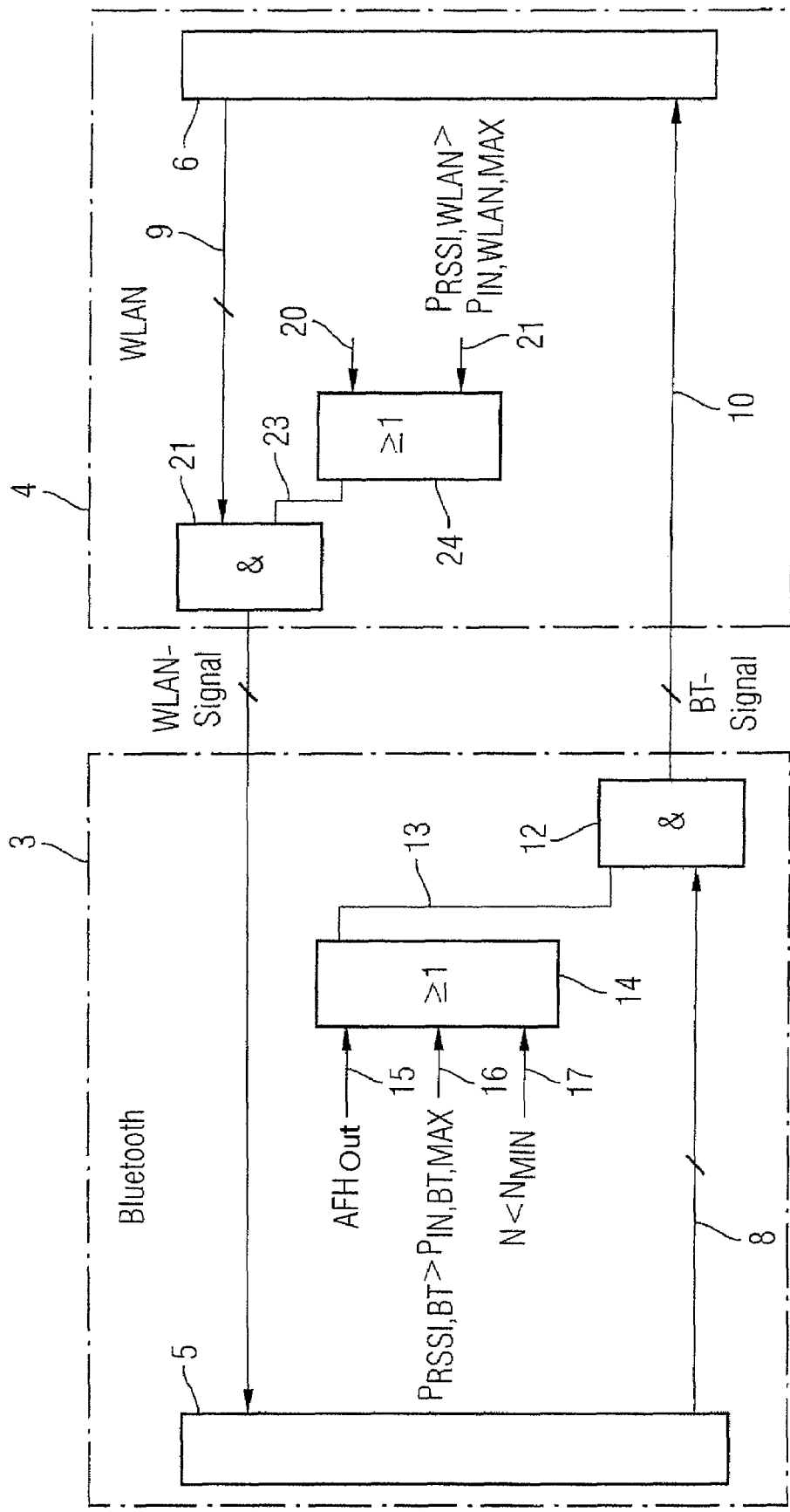

METHOD AND APPARATUS FOR ADAPTIVE ACTIVATION OR DEACTIVATION OF THE COORDINATION OF THE RADIO ACTIVITIES OF TWO MOBILE-RADIO TRANSMITTING AND/OR RECEIVING DEVICES

CROSS-REFERENCE TO RELATED APPLICATION

This application is a continuation of co-pending International Application No. PCT/DE2005/000464 filed Mar. 14, 2005, which designates the United States, and claims priority to German application No. DE 10 2004 013 494.4 filed Mar. 18, 2004.

TECHNICAL FIELD

The invention relates to a method for activation or deactivation of the coordination of the radio activities of two mobile radio transmitting and/or receiving devices, in which a cable-based information interchange takes place for coordination between the two transmitting and/or receiving devices or between each of the transmitting and/or receiving devices and a common device which controls the coordination. The invention also relates to a corresponding apparatus.

BACKGROUND

The integration of two different types of mobile radio transceivers, for example based on a Standard from the IEEE 802.11 Working Group (for example IEEE-802.11b)—referred to for simplicity in the following text as the IEEE-802.11 Standard or with the attribute WLAN (Wireless Local Area Network)—and the Bluetooth Standard in one appliance can lead to interference with the two transceivers in one direction or mutually. Particularly when the two transceivers are using the same or intersecting frequency ranges, their simultaneous radio activity can have a negative influence on the transmission behavior of one or both transceivers. If both transceivers transmit at the same time, the two transmitted signals are superimposed and can be separated by the corresponding communication partners only with difficulty. If one transceiver is transmitting while the other transceiver is receiving, the reception sensitivity is considerably restricted because of a poor antenna isolation. A similar influence can also be seen when the frequency ranges of the two transceivers are located very close to one another since, in this case, the sidebands interfere with the transmission behavior.

The influence of the interference at one end or mutual interference can be reduced by suitable restriction of the respectively used frequency ranges or by time coordination of the radio activities. Measures such as these for coordination of the radio activities are also referred to as co-existence or interoperability measures. The influence of interference at one end or of mutual interference can be virtually precluded in particular by time coordination of the radio activities. In order to allow time coordination of the radio activities, cable-based information interchange is necessary between the two transceivers or between each of the transceivers and a common device, in particular a common main processor (host), which controls the coordination process. The interchanged information is used to decide which of the transceivers may carry out radio activities, and which of the transceivers must delay or terminate the radio activities.

Basic recommendations for the co-existence of two transceivers are described in the provisional IEEE Standard Document IEEE P802.15.2/Draft #09, Mar. 24, 2003.

The document EP 1 119 137 A1 discloses an appliance in which both a Bluetooth transceiver and an IEEE-802.11 transceiver are integrated. In order to avoid interference caused by simultaneous radio activities by both transceivers, this document proposes that a so-called interoperability device be provided for time coordination of the radio activities. In this case, the interoperability device monitors the data flow between each of the two standard-specific drivers, the Bluetooth driver and the WLAN driver, and the transceiver elements which are associated with the physical interface. The interoperability device prevents the two transceivers from transmitting at the same time. It optionally prevents one transceiver from transmitting when the other transceiver is receiving or transmitting at the same time. This procedure makes it possible to ensure that the functionality of the two transceivers is fundamentally maintained, even in very poor environmental conditions or in critical applications. Time coordination of the radio activities of the two transceivers in this way has the disadvantage that, in many applications or operating situations, in which there is no evidence of the influence of interference at one end or mutually, the transmission capacity of one transceiver or of both transceivers is unnecessarily reduced by the coordination of the radio activities.

SUMMARY

A method for activation or deactivation of the coordination of the radio activities of a first mobile radio transmitting and/or receiving device and of a second mobile radio transmitting and/or receiving device, in which simultaneous radio activities of both transmitting and/or receiving devices can cause transmission interference, and a cable-based information interchange takes place for coordination between the two transmitting and/or receiving devices or between each of the transmitting and/or receiving devices and a common device which controls the coordination, may comprise the steps of a) determining a value of at least one characteristic variable which is characteristic of the requirement for coordination of the radio activity of the first transmitting and/or receiving device and/or for the coordination of the radio activity of the second transmitting and/or receiving device; and b) activating or deactivating the coordination of the radio activity of the first transmitting and/or receiving device and/or of the coordination of the radio activity of the second transmitting and/or receiving device as a function of the value of the at least one characteristic variable.

BRIEF DESCRIPTION OF THE DRAWINGS

The invention will be explained in more detail in the following text on the basis of two exemplary embodiments and with reference to the drawings, in which:

FIG. 1 shows an illustration of the required spectral transmission mask based on the IEEE-802.11 Standard;

FIG. 2 shows a block diagram of a first embodiment of the activation and deactivation of the coordination of the radio activities; and FIG. 3 shows a block diagram of a second embodiment of the activation and deactivation of the coordination of the radio activities.

DETAILED DESCRIPTION

A method for operation of two mobile radio transmitting and/or receiving devices may ensures interference-free operation of both transmitting and/or receiving devices, but avoid any unnecessary restriction to the transmission capacity of one or of both transmitting and/or receiving devices.

The method according to one embodiment is based on the capability for coordination of the radio activities of a first mobile radio transmitting and/or receiving device and of a second mobile radio transmitting and/or receiving device. For the purposes of this application, a radio activity may comprise either a transmitting activity or a receiving activity. Simultaneous radio activities of the two transmitting and/or receiving devices can cause transmission interference. A cable-based information interchange takes place for coordination between the two transmitting and/or receiving devices or between each of the transmitting and/or receiving devices and a common device which controls the coordination.

A method according to an embodiment comprises two steps: In a first method step, a value of at least one characteristic variable can be determined. This at least one characteristic variable can be characteristic of the requirement for coordination of the radio activity of the first transmitting and/or receiving device and/or for the coordination of the radio activity of the second transmitting and/or receiving device. In a second method step, the coordination of the radio activity of the first transmitting and/or receiving device and/or the coordination of the radio activity of the second transmitting and/or receiving device can be activated or deactivated as a function of the value of the at least one characteristic variable.

The adaptive activation or deactivation of the coordination of the radio activities may ensure interference-free operation of both transmitting and/or receiving devices. This can avoid unnecessary restriction of the transmission capacity of one or both transmitting and/or receiving devices. The method is in this case based on the discovery that the coordination of the radio activities, in particular in order to prevent simultaneous radio activity, is necessary or unnecessary, and is thus even restrictive, depending on the application and the instantaneous environmental situation of the two transmitting and/or receiving devices. The method can make it possible to adaptively decide for the respective application and the instantaneous environmental conditions whether or not the radio activities should be coordinated in order to ensure interference-free operation. It may be therefore also unnecessary to implement the coordination of the radio activities as a function of an application, for example as a function of the antenna separation, or not to implement this coordination, since the coordination is in any case adaptively activated or deactivated. Transmitting and/or receiving devices which operate on the basis of the method according to an embodiment can thus be used universally. This can make it possible to reduce the product portfolio to standard components which can be used universally, while at the same time additionally avoiding adaptation of the co-existence measures for the corresponding application.

Furthermore, the method according to an embodiment offers the capability to activate or deactivate the coordination of the radio activity of the first transmitting and/or receiving device and the coordination of the radio activity of the second transmitting and/or receiving device independently of one another. This makes it possible to take account of differences relating to the characteristics of the two transmitting and/or receiving devices, for example significantly different output power levels or input sensitivities, with respect to co-existence measures as well.

The at least one variable which is characteristic of the requirement for coordination may be advantageously an input-signal level and/or a data error rate, in particular a bit error rate and/or a packet error rate. In this case, the at least one characteristic variable can be defined by a receiver in the two transmitting and/or receiving devices. Furthermore, it is also possible to use a plurality of characteristic variables, in which case each two identical characteristic variables are defined by in each case one receiver in the two transmitting and/or receiving devices.

According to one embodiment of the method, the value of the at least one characteristic variable can be determined, and the activation and deactivation of the coordination of the radio activity of the first transmitting and/or receiving device and the coordination of the radio activity of the second transmitting and/or receiving device can be carried out by one of the two transmitting and/or receiving devices. In this case, it may be possible for these tasks to be associated with the transmitting and/or receiving device with the lower typical output power. The radio traffic of the transmitting and/or receiving device with the lower typical output power can be in general subject to greater interference by simultaneous radio activities of the two transmitting and/or receiving devices than the radio traffic of the transmitting and/or receiving device with the higher typical output power. It is thus expedient for the transmitting and/or receiving device with the lower typical output power to determine the at least one variable which can be characteristic of the requirement for coordination of the radio activity of both transmitting and/or receiving devices. If, in addition, the activation and deactivation of the coordination is carried out entirely by the transmitting and/or receiving device with the lower typical output power, this simplifies the interface between the two transmitting and/or receiving devices. For the purposes of the invention, it would also in principle be feasible to carry out only the determination of the characteristic variables in the transmitting and/or receiving device with the lower typical output power. Alternatively, the abovementioned statements relating to the transmitting and/or receiving device with the lower typical output power can also be transferred in an analogous manner to the transmitting and/or receiving device with the poorer typical input sensitivity.

According to one embodiment, which is an alternative to the embodiment mentioned above, the method procedure can also be distributed between the two transmitting and/or receiving devices. In this case, the first method step mentioned above can be subdivided into two step elements: in the first step element, a value is determined for at least one first characteristic variable by the second transmitting and/or receiving device. This first characteristic variable can be characteristic of the requirement for coordination of the radio activity of the first transmitting and/or receiving device. In the second step element, a value can be determined for at least one second characteristic variable by the first transmitting and/or receiving device, which is characteristic of the requirement for coordination of the radio activity of the second transmitting and/or receiving device. In a similar manner, the second method step mentioned above can also be subdivided into two step elements: in the first step element, the coordination of the radio activity of the first transmitting and/or receiving device is activated or deactivated as a function of the determined value of the first characteristic variable by the second transmitting and/or receiving device. In a second step element, the coordination of the radio activity of the second transmitting and/or receiving device can be activated or deactivated as a function of the determined value of the second characteristic variable by the first transmitting and/or receiving device.

In this alternative embodiment, one transmitting and/or receiving device decides whether it is necessary to coordinate the radio activity of the respective other transmitting and/or receiving device, and whether this should thus be activated or deactivated. The respective characteristic variable may in this case also be regarded as a measure of the interference with the radio traffic of the transmitting and/or receiving device which is determining this variable. Thus, for example, if the first transmitting and/or receiving device is subject to interference with its radio traffic (primarily by the second transmitting and/or receiving device), the invention results in the coordination of the radio activity of the second transmitting and/or receiving device being activated. If, however, the radio traffic of the second transmitting and/or receiving device is not adversely affected (for example because the transmission and/or reception power of the second transmitting and/or receiving device is higher), the coordination of the radio activity of the first transmitting and/or receiving device by the second transmitting and/or receiving device is deactivated. Since the first transmitting and/or receiving device obviously has no negative effect on the radio traffic of the second transmitting and/or receiving device, there is no need, and because of the restriction associated with the coordination it is also not expedient, to coordinate the radio activity of the first transmitting and/or receiving device. Thus, in the alternative embodiment of the method, the coordination of the one transmitting and/or receiving device can be operated in accordance with the prevailing adverse effect on the respective radio traffic, independently of the coordination of the respective other transmitting and/or receiving device.

In principle, it would also be feasible to carry out only the determination of the first and second characteristic variables by the second and first transmitting and/or receiving device, respectively.

One of the two transmitting and/or receiving devices advantageously operates on the basis of the Bluetooth Standard. In this case, it is advantageous for this transmitting and/or receiving device to operate on the basis of the Bluetooth Standard Version 1.2 or higher. In this case, it is particularly advantageous for the characteristic variable which is determined by this transmitting and/or receiving device to be the statement as to whether or not a radio link is present based on the Bluetooth-specific adaptive frequency hopping method. Alternatively or additionally, the number of the channels or channel pairs which are classified as being good or poor can be used as the characteristic variable for a radio link based on the Bluetooth-specific adaptive frequency hopping method.

The Bluetooth Standard, which requires a frequency hopping method, offers the additional capability, from Version 1.2, for adaptive assignment of the frequency channels. In this case, the only frequency channels which are used are those which have a small amount of interference. In the Bluetooth Standard version 1.2, a frequency hopping method in which the frequency channels to be used are assigned adaptively is also referred to as AFH (Adaptive Frequency Hopping). When using the AFH method, the attribute "good" or "bad" is in each case assigned to the maximum of 79 available Bluetooth channels on the basis of reference measurements, depending on the amount of interference. In principle, only those channels which are provided with the attribute "good" are used for the subsequent transmission on the basis of the AFH method. In this case, the minimum number $N_{MIN}$ of channels which are provided with the attribute "good" for the AFH method is limited to 20. The AFH method cannot be used for radio links from a transmitting and/or receiving device which is operating on the basis of the Bluetooth Standard Version 1.2 to other Bluetooth-compatible appliances which are operating on the basis of the Bluetooth Standard Version 1.1 or 1.0. If it is not possible for one Bluetooth-compatible transmitting and/or receiving device to use the AFH method because of the communication partner, it is absolutely, essential in order to ensure interference-free radio traffic for this transmitting and/or receiving device that the radio activity of the other transmitting and/or receiving device is coordinated. The statement (which is known in the Bluetooth-compatible transmitting and/or receiving device) as to whether a radio link based on the AFH method is present, can thus be used to control the co-existence measures. To this extent, this statement can be used as a characteristic variable for activation or deactivation of the coordination of the radio activities, in particular for coordination of the other transmitting and/or receiving device. If a Bluetooth link is set up without using the AFH method, then it is expedient in principle to activate or to keep activated the coordination of the radio activities, in particular the coordination of the radio activity of the other transmitting and/or receiving device. Alternatively or optionally, the number of channels which are classified as "good" or "bad" can be used to control the co-existence measures. By way of example, the minimum number $N_{MIN}=20$ can be used as a switching threshold. If the number of channels provided with the attribute "good" for the AFH method falls below the threshold of $N_{MIN}=20$, the coordination of the radio activities, in particular the coordination of the radio activity of the second transmitting and/or receiving device, is in principle activated.

It is advantageous for one of the two transmitting and/or receiving devices to operate on the basis of the IEEE-802.11 Standard, in particular on the basis of the IEEE-802.11k Standard. The IEEE-802.11k Standard, which has not yet finally been specified, offers the advantage that it provides better signal quality monitoring. This can improve and simplify the measurement and evaluation of the variable which is characteristic of the signal quality, for example the received signal level. In particular, these internally determined variables can be accessed very easily. This makes it possible to use these variables as characteristic variables for activation or deactivation of the coordination of the radio activities.

The apparatus according to one embodiment is based on the capability for coordination of the radio activities of a first mobile radio transmitting and/or receiving device and of a second mobile radio transmitting and/or receiving device. Cable-based information interchange can be carried out for coordination purposes between the two transmitting and/or receiving devices or between each of the transmitting and/or receiving devices and a common device which controls the coordination.

The apparatus according to one embodiment may have at least one determination means for determination of at least one characteristic variable. This at least one characteristic variable can be characteristic of the requirement for coordination of the radio activity of the first transmitting and/or receiving device and/or for the coordination of the radio activity of the second transmitting and/or receiving device. Furthermore, the apparatus according to an embodiment may have at least one switching means for activation or deactivation of the coordination of the radio activity of the first transmitting and/or receiving device, and/or of the coordination of the radio activity of the second transmitting and/or receiving device. This at least one switching means may be controlled as a function of the at least one characteristic variable.

In the case of the at least one determination means and the at least one switching means, there may be no need for the purposes of the application for these means to be provided in dedicated hardware. These means can also be implemented in software which is processed in a processor, in particular in a DSP.

The switching means can be advantageously designed to suppress the information interchange which is required for coordination. This allows the coordination of the radio activity to be controlled in a simple manner. If a switching means suppresses the information flow (co-existence signals) which have to be read into this device via a cable-based interface (co-existence interface) for coordination of the radio activity of the respective transmitting and/or receiving device, this results in the coordination of the radio activity of this transmitting and/or receiving device being deactivated in a simple manner. Conversely, the coordination of the radio activity of a transmitting and/or receiving device can be activated and kept activated when the co-existence signals which must be read into this device are not suppressed by the switching means. The information interchange can be suppressed by switched interruption of the physical co-existence interface or else on a software-controlled basis on higher protocol layers. Furthermore, the activation or deactivation of the coordination by enabling or suppressing the co-existence signaling may offer the advantage that a transmitting and/or receiving device which is operating according to an embodiment can be used independently of the application: if only one first transmitting and/or receiving device is present, it does not receive any co-existence signals. In this case, there is no need to coordinate the radio activity of this transmitting and/or receiving device, and the coordination is automatically deactivated because no co-existence signals can be read.

There is therefore no need for explicit matching of the transmitting and/or receiving device to this application. This also applies to the situation in which the second transmitting and/or receiving device is switched off. In this case as well, there is no need for coordination of the radio activity of the first transmitting and/or receiving device in this operating mode. The coordination of the radio activity is automatically deactivated because no co-existence signals can be read.

The following exemplary embodiments are based on the assumption that two transceivers are integrated in a common appliance, for example a Bluetooth/WLAN plug-in card for a laptop or a desktop PC. The two transceivers are a Bluetooth transceiver and a WLAN transceiver, which are respectively compatible with the Bluetooth Standard Version 1.2 and with the IEEE-802.11 Standard.

The antenna separation between two transceivers governs the antenna isolation, and is the critical factor for the interference influence which is exerted by the radio activity of one of the transceivers on the radio activity of the other one of the transceivers.

The transceiver which is operating on the basis of the Bluetooth Standard uses a frequency hopping method, in which the transmission frequency and thus the transmission channel are changed at a maximum hopping rate of 1600 hops per second. The unlicensed ISM band (Industrial Scientific Medical) from 2,400 to 2,485 GHz is used for transmission and, in accordance with the Bluetooth Standard, is subdivided into 79 channels, each having a bandwidth of 1 MHz.

According to the specification for the IEEE-802.11 Standard, the WLAN transceiver operates in the same frequency range. The bandwidth of a WLAN channel is 22 MHz, thus resulting in three channels, which do not intersect, in the frequency range under consideration from 2,400 to 2,485 GHz. In contrast to the Bluetooth Standard, the channel which is used is in this case static for the time duration of 1 link. Without suitable co-existence measures, which are used to coordinate the radio activities of the transceivers, one transceiver could have a massive interference influence on the other transceiver, and/or vice versa, in some circumstances in the event of simultaneous radio activity by the two transceivers.

The AFH method, which is specified in the Bluetooth Standard Version 1.2 and has already been mentioned above, can be used for the Bluetooth transceiver in order to prevent interference with the transceivers. The AFH method can in principle be used only when the Bluetooth receiver is linked to a further appliance which is operating on the basis of Version 1.2 of the Bluetooth Standard. In this situation, in which the Bluetooth transceiver can use the AFH method, the frequency ranges which are used by the WLAN transceiver are classified as "bad" for the radio traffic of the Bluetooth transceiver on the basis of the AFH method, and accordingly not used. If the Bluetooth transceiver cannot use the AFH method, the radio activities of the Bluetooth transceiver and/or of the WLAN transceiver must necessarily be coordinated in order to prevent interference. The aim of coordination of the radio activities is to prevent the two transceivers carrying out radio activity at the same time. In particular, the aim is to prevent the two transceivers from transmitting at the same time, or both transceivers receiving at the same time, or one transceiver transmitting while the other transceiver is receiving at the same time. If the Bluetooth transceiver is operating on the basis of the AFH method, the time coordination of the radio activities is in some circumstances unnecessary or is even restrictive, since the coordination process can result in the loss of transmission capacity. Thus, according to an embodiment, the deactivation of the time coordination is coupled to the presence of a link based on the AFH method.

When a link based on the AFH method is in existence, interference may nevertheless make it necessary to carry out time coordination of the radio activities of the transceivers. The amount of interference depends inter alia on the signal power of the transmitting transceiver, the suppression of the transmission signal outside the transmission frequency band (governed by the bandwidth) of the transmitting transceiver, a bandwidth-correction factor, the reception filter of the receiving transceiver, and the antenna isolation of the two transceivers. Fundamentally, a distinction can be drawn between two situations relating to this interference.

1. If one of the two transceivers is transmitting while the other transceiver is receiving, the transmitted signal from the transmitting transceiver can block the receiving transceiver. This is the situation when the signal power (which causes interference to the receiving transceiver) of the transmitting transceiver, for example the WLAN transceiver, exceeds a certain threshold value at the location of the antenna of the receiving transceiver, for example the Bluetooth transceiver, beyond which threshold value the receiver of the receiving transceiver no longer operates linearly and thus can no longer detect a simultaneously received useful signal. This is also referred to as overdriving of the receiver. Blocking such as this can also occur when the interfering signal power of the transmitting transceiver is outside the actual reception frequency band, since the reception filter has only a finite blocking effect. In this case, the risk of receiver blocking becomes greater the closer the antennas of the two transceivers are to one another, and thus the less the antenna isolation. Furthermore, the risk of blocking becomes greater the greater the power that is transmitted by the transmitting transceiver. Since the transmission power of the transmitting transceiver is continuously matched to the distance to a further mobile radio which is connected to this transceiver by radio, the reception state of the receiving transceiver may change continuously, that is to say whether or not the receiver is blocked. If reception conditions such as these for the receiving transceiver occur statically or dynamically, in such a way that blocking can be expected, the transmission activity of the transmitting transceiver and the reception activity must necessarily be coordinated in time with respect to one another, so that it is possible to preclude simultaneous radio activity of both transceivers. If blocking of the receiver as a result of good reception conditions can be precluded, time coordination of the two transceivers is required only in some circumstances (see 2.). In this case, the value of the received signal level of the receiving transceiver can be used as an indicator as to whether time coordination of the radio activities is necessary, and this signal level is unusually high when there is a risk of blocking. The value of the signal level is available internally in the receiver of each transceiver as RSSI information $P_{RSSI}$ (Radio Signal Strength Indicator).

If the signal level $P_{RSSI}$ exceeds the threshold value $P_{IN,MAX}$ of the signal level beyond which the linearity of the receiver in the receiving transducer can no longer be ensured, time coordination of the radio activities is necessary. If the receiver in the Bluetooth transceiver is blocked, then all of the Bluetooth channels are in general classified as "bad". The number of channels classified as "good" or "bad" can thus also be used as a further indication of the presence of receiver blocking in the Bluetooth transceiver, in particular whether the number N of channels classified as "good" is less than the required minimum number $N_{MIN}$. Alternatively, in the situation in which the transmitter in the Bluetooth transceiver is interfering with the receiver in the WLAN transceiver, overshooting of a specific bit error rate and/or packet error rate can be used as an indication of receiver blocking in the WLAN transceiver.

2. In addition to the risk described in paragraph 1, of general blocking of a receiver in the two transceivers being caused by power-related overdriving, it is also feasible for the sensitivity of the receiver in the receiving transceiver to be made worse by simultaneous transmission activity by the other transceiver. Assuming the existence of a Bluetooth link based on the AFH method, interference caused by spectral components within the transmission bandwidth of the transmitted signal on the receiving transceiver is in general prevented. Nevertheless, it can be expected that the sensitivity of the receiver in the receiving transceiver will be reduced, since the transmission spectrum has noticeable signal components outside the transmission bandwidth, that is to say in the sidebands. These signal components of the signal which is transmitted by the transmitting transceiver, for example the WLAN transceiver, interfere with the reception of the receiving transceiver in the form of a noise signal.

FIG. 1 shows the profile of the transmission spectrum mask 1 as specified in the IEEE-802.11 Standard, and the profile of a sine x/x function 2 on which this is based. The details relating to the transmission spectrum mask have been taken from the IEEE-802.11 specification document "ANSI/IEEE Std 802.11", 1999 edition, section 15.4.7.4, pages 218 and 219. In this case, the requirement for the spectral distribution of the transmitted signal, in particular in the region of the sidebands, is that the spectral component within the frequency ranges fc−22 MHz<f<fc−11 MHz and fc+11 MHz<f<fc+22 MHz—that is to say outside the transmission bandwidth of fc−11 MHz<f<fc+11 MHz must not exceed the value of −30 dBr. In this case, the variable dBr represents "dB relative to the maximum value of the sine x/x function on which this is based". A further requirement is that the spectral component within the frequency ranges f<fc−22 MHz and f>fc+22 MHz must not exceed the value of −50 dBr. In this case, the variable fc describes the channel mid-frequency. The transmission spectrum mask 1 shown in FIG. 1 can be used to determine the interference level of the transmitting WLAN transceiver on the receiving Bluetooth transceiver as a function of the separation between the Bluetooth channel mid-frequency and the WLAN channel mid-frequency. The absolute interference level at the receiver of the Bluetooth transceiver is also dependent on the antenna isolation between the two antennas, and on the output power of the WLAN transceiver. If the interference level in the frequency range of the useful frequency band of the Bluetooth receiver is above a minimum reception sensitivity $P_{MIN}$ (for Bluetooth, $P_{MIN,BT}$=−70 dBm), this leads to a restriction to the Bluetooth receiver, in particular to a reduction in the possible connection radius of the Bluetooth link. In order to prevent this, the radio activities of the two transceivers should be coordinated in a situation such as this.

When interfering sidebands cause an adverse effect on the reception sensitivity such as this, then a large number of Bluetooth channels or even all of the Bluetooth channels will be classified as "bad". The number of channels which are classified as "good" or "bad" can thus be used as an indication of the presence of an adverse effect on the reception sensitivity of the Bluetooth receiver as well, in particular whether the number N of channels classified as "good" is less than the required minimum number $N_{MIN}$. Alternatively, the fact that a specific bit error rate and/or packet error rate has been exceeded can be used as any indication of the presence of an adverse effect on the reception sensitivity. In the situation where the transmitter of the Bluetooth transceiver is interfering with the receiver in the WLAN transceiver, the fact that a specific bit error rate and/or packet error rate has been exceeded can be used as an indication of the presence of an adverse effect on the reception sensitivity of the WLAN transceiver.

The following numerical example illustrates that the simultaneous transmission activity of the WLAN transceiver would not necessarily in general have any adverse effect on the reception sensitivity of the Bluetooth receiver, so that the coordination of the radio activities can in this situation be deactivated:

On the basis of a WLAN transceiver transmission power of 15 dBm and antenna isolation of 30 dB, the interference power caused by the WLAN transceiver in the Bluetooth receiver in the frequency range fc−22 MHz<f<fc+22 MHz, where fc is the channel mid-frequency of the WLAN transceiver, is −65 dBm. In addition, a bandwidth correction factor of approximately 10 dB must be taken into account because of the different frequency bandwidths of a Bluetooth channel and of a WLAN channel, so that the effective interference power caused by the WLAN transceiver at the Bluetooth receiver becomes −75 dBm. This interference level is 5 dB less than the minimum reception sensitivity of $P_{MIN,BT}$=−70 dBm specified in the Bluetooth Standard, so that there is no need to expect any significant adverse effect on the reception sensitivity when subject to these constraints, and the connection distance of 10 m required in the Bluetooth Standard can be maintained. If, in addition to interference between the two transceivers, interference from further external interference sources outside the appliance which contains the two transceivers is also taken into account, such as a further WLAN appliance, then these interference sources can lead to the need for activation of coordination of the radio activities of the two transceivers even though the interference influence of one transceiver on the other transceiver does not in its own right justify activation. In this situation, the overall interference level for the receiving transceiver is nevertheless noticeably reduced by activation of the coordination of the radio activities. The additional influence of further external interference sources becomes noticeable, for example in the Bluetooth transceiver, by the number N of Bluetooth channels specified with the attribute "good" falling below the required number $N_{MIN}$, while the number of Bluetooth channels specified with the attribute "good" is above the required number $N_{MIN}$ without further external interference sources. If the additional external interference sources result in the number N of Bluetooth channels specified with the attribute "good" becoming less than the required number $N_{MIN}$, the coordination of the radio activities can be switched on. If the number N of Bluetooth channels which are specified with the attribute "good" increases again, when the interference sources are switched off or have been removed from the surrounding area, the co-existence measures can be deactivated again.

FIG. 2 shows a block diagram of a first embodiment of the activation and deactivation of the coordination of the radio activities. In this case, the Bluetooth transceiver 3 and the WLAN transceiver 4, as already mentioned above, are accommodated in the common appliance (not illustrated). Co-existence signals 9 and 10 are interchanged via cable-based interfaces between the two transceivers in order to coordinate the radio activities. In this case, a control means 5 and a control means 6, respectively, are provided in the Bluetooth transceiver 3 and in the WLAN transceiver 4. The control means 6 leads to the co-existence signal 10 from the Bluetooth transceiver 3, which is used for time coordination of the radio activity of the WLAN transceiver 4, with the control means 6 determining the time of transmission or reception activity of the WLAN transceiver as a function of the co-existence signal 10. Conversely, the control means 6 emits a co-existence signal 9 which is used for time coordination of the radio activity of the Bluetooth transceiver 3. By way of example, a co-existence signal 9 or 10 indicates whether the associated transceiver is currently transmitting a radio signal, for example a data packet, or intends to transmit a radio signal in the immediate future. Alternatively or additionally, it is feasible for a signal 9 or 10 such as this to indicate whether the associated transceiver is currently receiving a radio signal. The co-existence signal 9 emitted from the control means 6 is applied to the input of a switching means 11 (in this case illustrated as an AND gate). The signal 9 is either passed to the output of the switching means 11, or is decoupled from the output of the switching means 11, depending on a control signal 13 which is applied to the switching means 11. The output signal 7 from the switching means 11 is read to the control means 5. The co-existence signal 8 which is emitted from the control means 5 is passed in an analogous manner to the input of a switching means 12, whose output signal corresponds to the signal 10. The signal 8 is either passed to the output of the switching means 12, or is decoupled from the output of the switching means 12, depending on the control signal 13. In this case, the switching means 11 and 12 are arranged in the Bluetooth transceiver 3. The control signal 13 for the switching means 11 and 12 is produced from variables which are available internally in the Bluetooth transceiver. In this case, the control signal 13 is set such that the switching means 11 and 12 represent a short circuit when one of the following switching conditions is satisfied:

a) there is no AFH link (AFH off);

b) the signal level $P_{RSSI,BT}$ is greater than the threshold value $P_{IN,BT,MAX}$ of the signal level beyond which the linearity of the receiver in the receiving Bluetooth transceiver can no longer be ensured; or c) the number of Bluetooth channels N classified as "good" is less than the minimum required number $N_{MIN}$.

This logic operation is simulated by the OR gate 14, whose input variables 15 to 17 represent Boolean variables based on the conditions a), b) and c), respectively. If there is a short circuit, then the coordination of the radio activity of the respectively driven transceiver is activated, while if there is an open circuit, the coordination of the radio activity of the respectively driven transceiver is deactivated. The exemplary embodiment illustrated in FIG. 2 can be implemented by logic gates or else in software which works in a logically adequate manner.

The exemplary embodiment illustrated in FIG. 2 is based on the idea of the activation and deactivation of the co-existence measures in general being controlled by the transceiver with the lower typical output power, that is to say the Bluetooth transceiver 3, since the transceiver with the lower output power, and hence also the lower reception power, is subject to greater interference from the respective other transceiver. The output power of the WLAN transceiver 4 is typically 20 dBm, while that of the Bluetooth transceiver 3 is 0 dBm. In this case, not only are the variables such as $P_{RSSI}$ and N, which are characteristic of the requirement for activation or deactivation of the co-existence measures, determined or checked in the Bluetooth transceiver but also the activation or deactivation of the coordination of the radio activity of the Bluetooth transceiver and also of the WLAN transceiver are carried out by the switching means 11 and 12, respectively, in the Bluetooth transceiver. The Bluetooth transceiver 3 thus decides whether time coordination is in general necessary. If one of the switching conditions a) to c) is satisfied, co-existence signals 9 and 10 are interchanged between the control means 5 and 6. In the situation in which none of the switching conditions a) to c) is satisfied, the co-existence signals 8 and 9, respectively, emitted from the control means 5 and 6 are ignored by the respective other control means 6 and 5.

FIG. 3 shows a block diagram of a second embodiment of the activation and deactivation of the coordination of the radio activities. The structures which are provided with reference symbols of the same name in FIGS. 2 and 3 correspond to one another. In contrast to the exemplary embodiment illustrated in FIG. 2, the decision as to whether it is necessary to coordinate the radio activity of the respective other transceiver 4 or 3 is made in each of the transceivers 3 and 4. Transceiver-internal variables which are available to both transceivers are in each case used for decision-making. The control signal 13 is thus used, in contrast to the exemplary embodiment shown in FIG. 2, only to control the switching means 12, as a result of which only the coordination of the radio activity of the WLAN transceiver 4 is activated or deactivated as a function of Bluetooth-internal variables. The activation or deactivation of the coordination of the radio activity in the Bluetooth transceiver 3 is carried out as a function of WLAN-internal variables. The output signal 9 from the control means 6 which is associated with the WLAN transceiver 4 is applied to the input of a switching means 21, whose function corresponds to that of the switching means 11 shown in FIG. 2. In contrast to the switching means 11 from FIG. 2, the switching means 21 is controlled as a function of a control signal 23. Furthermore, it is associated with the WLAN transceiver 4. In this case, the control signal 23 is set such that the switching means 21 represents a short circuit when the signal level $P_{RSSI,\ WLAN}$ received in the WLAN transceiver is greater than the threshold value $P_{IN,WLAN,MAX}$ of the signal level beyond which the linearity of the receiver in the WLAN transceiver can no longer be ensured. In addition to the Boolean variable 21 that is linked to this condition, one or more further Boolean variables 20 may also be provided, which are based on the specific characteristics of the IEEE-802.11k Standard. In particular, the signal level which is determined internally on the basis of the IEEE-802.11k Standard can for this purpose be compared with a threshold value, and the comparison result can be checked.

If one of the receivers in the transceivers 3 or 4 is adversely affected by the transmission activity of the respective other transceiver 4 or 3, then this attempts to coordinate the radio activity of the respective other transceiver 4 or 3 by means of a co-existence signal. If no such adverse effect is present, the radio activity of the respective other transceiver 4 or 3 is not coordinated. When a co-existence signal is effectively read in but no co-existence signal is effectively emitted, its own radio activities are admittedly coordinated, since the respective switching means 12 or 21 suppresses the information interchange. A scenario such as this can occur, for example, on the basis of the constraints of the numerical example described above. Without any further external interference source, the reception sensitivity of the Bluetooth transceiver is not adversely affected. The radio activity of the WLAN transceiver need not be coordinated. If further external interference sources are assumed, for example a further external WLAN appliance, the radio activity of the WLAN transceiver may need to be coordinated in order to ensure the required reception sensitivity of the Bluetooth transceiver 3. Because of the lower output power of the transmitter in the Bluetooth transceiver 3 in comparison to the WLAN transceiver 4, the interference with the WLAN transceiver 4 is insignificant, so that the radio activity of the Bluetooth transceiver 3 need not be coordinated. This makes it possible to effectively interchange co-existence signals from the Bluetooth transceiver 3 to the WLAN transceiver 4 in order to influence the timing of the radio activity of the WLAN transceiver 4 without influencing the radio activity of the Bluetooth transceiver 3. This therefore allows unidirectional interchange of co-existence signals, as a result of which only the radio activity of one transceiver is coordinated. The described situation also applies in an analogous manner to interference with the WLAN transceiver 4. Furthermore, the exemplary embodiment which is illustrated in FIG. 3 makes it possible to match the radio activities of both transceivers 3 and 4 when the transceivers are interfering with one another.

For the purposes of the application, it would be feasible to modify the association of the switching means 11, 12 and 21 with the respective transceivers 3 and 4 from that illustrated in FIG. 2 and FIG. 3. For example, the switching means 12 could be associated with the WLAN transceiver 4. In this case, the control signal 13 would have to be transmitted via the interface between the Bluetooth transceiver 3 and the WLAN transceiver 4. The further switching means 11 and 21 could also be arranged in an analogous manner for simultaneous transmission of the control signals 13 and 23 via the interface in the WLAN transceiver and Bluetooth transceiver, respectively.

The exemplary embodiments illustrated in FIG. 2 and FIG. 3 may also be used in the situation in which both transceivers 3, 4 or parts of the two transceivers are integrated in a common chip. Furthermore, it is also feasible for the co-existence signals not to be interchanged directly between the transceivers. This is the situation in particular when co-existence signals are transmitted between each transceiver and a common device, for example a host, which controls the coordination process.

What is claimed is:

1. A method for activation or deactivation of the coordination of the radio activities of a first mobile radio transmitting and/or receiving device and of a second mobile radio transmitting and/or receiving device, in which simultaneous radio activities of both transmitting and/or receiving devices can cause transmission interference, and a cable-based information interchange takes place for coordination between the two transmitting and/or receiving devices or between each of the transmitting and/or receiving devices and a common device which controls the coordination, the method comprising:

a) determining a value of at least one characteristic variable which is characteristic of the requirement for coordination of the radio activity of the first transmitting and/or receiving device and/or for the coordination of the radio activity of the second transmitting and/or receiving device; and b) activating or deactivating the coordination of the radio activity of the first transmitting and/or receiving device and/or of the coordination of the radio activity of the second transmitting and/or receiving device as a function of the value of the at least one characteristic variable, wherein the determination of the value of the at least one characteristic variable and the activation and deactivation, the coordination of the radio activity of the first transmitting and/or receiving device, and the coordination of the radio activity of the second transmitting and/or receiving device are carried out by that of the two transmitting and/or receiving devices which has a lower typical output power.

2. The method as according to claim 1, wherein at least one characteristic variable is at least one of the variables mentioned below:

an input-signal level or a data error rate, in particular a bit error rate and/or a packet error rate.

3. The method as according to claim 1, wherein the coordination of the radio activities prevents both transmitting and/or receiving devices from carrying out a radio activity at the same time, in particular by both transmitting and/or receiving devices transmitting at the same time, or both transmitting and/or receiving devices receiving at the same time, or one transmitting and/or receiving device transmitting while the other transmitting and/or receiving device is receiving at the same time.

4. A method for activation or deactivation of the coordination of the radio activities of a first mobile radio transmitting and/or receiving device and of a second mobile radio transmitting and/or receiving device, in which simultaneous radio activities of both transmitting and/or receiving devices can cause transmission interference, and a cable-based information interchange takes place for coordination between the two transmitting and/or receiving devices or between each of the transmitting and/or receiving devices and a common device which controls the coordination, the method comprising:

a1) determining a value for at least one first characteristic variable by the second transmitting and/or receiving device, which is characteristic of the requirement for coordination of the radio activity of the first transmitting and/or receiving device;

a2) determining a value for at least one second characteristic variable by the first transmitting and/or receiving device, which is characteristic of the requirement for coordination of the radio activity of the second transmitting and/or receiving device;

b1) activating or deactivating the coordination of the radio activity of the first transmitting and/or receiving device as a function of the value determined in a1), by the second transmitting and/or receiving device; and b2) activating or deactivating the coordination of the radio activity of the second transmitting and/or receiving device as a function of the value determined in a2), by the first transmitting and/or receiving device.

5. An apparatus for activation or deactivation of the coordination of the radio activities of a first mobile radio transmitting and/or receiving device and of a second mobile radio transmitting and/or receiving device, in which simultaneous radio activities of both transmitting and/or receiving devices can cause transmission interference, and a cable-based information interchange takes place for coordination between the two transmitting and/or receiving devices or between each of the transmitting and/or receiving devices and a common device which controls the coordination, comprising
- at least one determination means for determination of at least one characteristic variable which is characteristic of the requirement for coordination of the radio activity of the first transmitting and/or receiving device and/or for the coordination of the radio activity of the second transmitting and/or receiving device; and
- a first switching means for activation or deactivation of the coordination of the radio activity of the second transmitting and/or receiving device as a function of the at least one characteristic variable; and
- a second switching means for activation or deactivation of the coordination of the radio activity of the first transmitting and/or receiving device as a function of the at least one characteristic variable.

6. The apparatus according to claim 5, wherein the at least one characteristic variable is at least one of the following variables:
- an input-signal level or
- a data error rate, in particular a bit error rate and/or a packet error rate.

7. The apparatus according to claim 5, wherein
the determination means,
the first switching means and
the second switching means
are associated with the transmitting and/or receiving device with the lower typical output power.

8. The apparatus according to claim 5, comprising:
a first determination means for determination of at least one first characteristic variable which is characteristic of the requirement for coordination of the radio activity of the first transmitting and/or receiving device, and
a second determination means for determination of at least one second characteristic variable which is characteristic of the requirement for coordination of the radio activity of the second transmitting and/or receiving device, with
the second determination means and the first switching means being associated with the first transmitting and/or receiving device, and
the first determination means and the second switching means being associated with the second transmitting and/or receiving device.

9. The apparatus according to claim 5, wherein the switching means is or are in each case designed to suppress the information interchange which is required for coordination.

10. The apparatus according to claim 5, wherein the two transmitting and/or receiving devices are integrated in a common appliance.

11. An apparatus for activation or deactivation of the coordination of the radio activities of a first mobile radio transmitting and/or receiving device and of a second mobile radio transmitting and/or receiving device, in which simultaneous radio activities of both transmitting and/or receiving devices can cause transmission interference, and a cable-based information interchange takes place for coordination between the two transmitting and/or receiving devices or between each of the transmitting and/or receiving devices and a common device which controls the coordination, comprising
- at least one determination means for determination of at least one characteristic variable which is characteristic of the requirement for coordination of the radio activity of the first transmitting and/or receiving device and/or for the coordination of the radio activity of the second transmitting and/or receiving device;
- at least one switching means for activation or deactivation of the coordination of the radio activity of the first transmitting and/or receiving device and/or of the coordination of the radio activity of the second transmitting and/or receiving device as a function of the at least one characteristic variable;
- a first switching means for activation or deactivation of the coordination of the radio activity of the second transmitting and/or receiving device, and
- a second switching means for activation or deactivation of the coordination of the radio activity of the first transmitting and/or receiving device;
- a first determination means for determination of at least one first characteristic variable which is characteristic of the requirement for coordination of the radio activity of the first transmitting and/or receiving device, and
- a second determination means for determination of at least one second characteristic variable which is characteristic of the requirement for coordination of the radio activity of the second transmitting and/or receiving device, with
the second determination means and the first switching means being associated with the first transmitting and/or receiving device, and
the first determination means and the second switching means being associated with the second transmitting and/or receiving device.

12. The apparatus according to claim 11, wherein the at least one characteristic variable is at least one of the following variables:
- an input-signal level or
- a data error rate, in particular a bit error rate and/or a packet error rate.

* * * * *